P. C. SOUTHWICK.
BALING PRESS.
APPLICATION FILED MAR. 13, 1916.

1,213,551.

Patented Jan. 23, 1917.
3 SHEETS—SHEET 1.

Inventor:
Plin C. Southwick
By ____ Attys.

Inventor:
Plin C. Southwick
By [signature]
Attys.

UNITED STATES PATENT OFFICE.

PLIN C. SOUTHWICK, OF SANDWICH, ILLINOIS.

BALING-PRESS.

1,213,551.                Specification of Letters Patent.      Patented Jan. 23, 1917.

Application filed March 13, 1916. Serial No. 83,848.

*To all whom it may concern:*

Be it known that I, PLIN C. SOUTHWICK, a citizen of the United States, and resident of Sandwich, county of Dekalb, and State of Illinois, have invented certain new and useful Improvements in Baling-Presses, of which the following is a specification, and which are illustrated in the accompanying drawings, forming a part thereof.

The invention relates to presses for baling hay and other fibrous materials, and particularly to the mechanism for actuating the plunger. In devices of this character it is essential that the driving mechanism be adapted to deliver maximum power on the compression stroke, and preferably this power should be greatest at the end of the stroke. It is also important that the return stroke be quickly accomplished, in order to save time and afford an opportunity for introducing a new charge into the compression chamber. These objects are secured by means of the mechanism hereinafter described, and illustrated in the accompanying drawings, in which—

Figure 1:
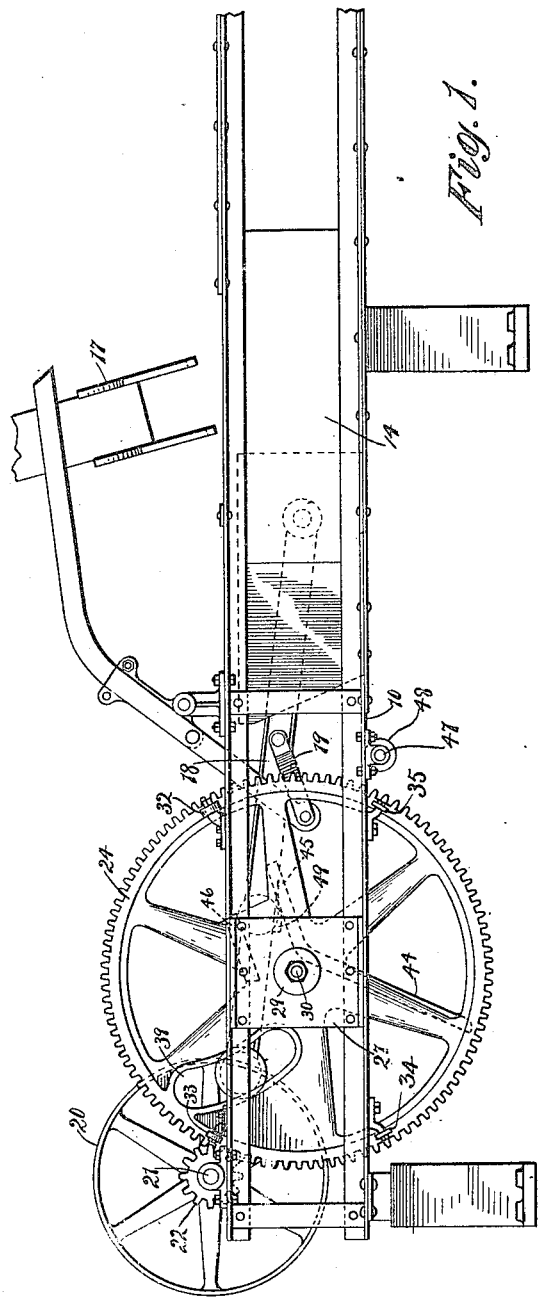
Figure 2:
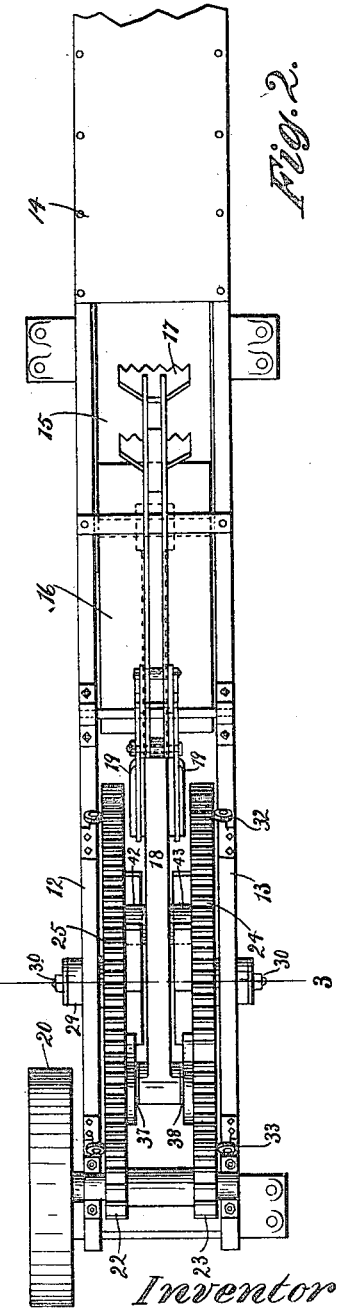
Figure 3:
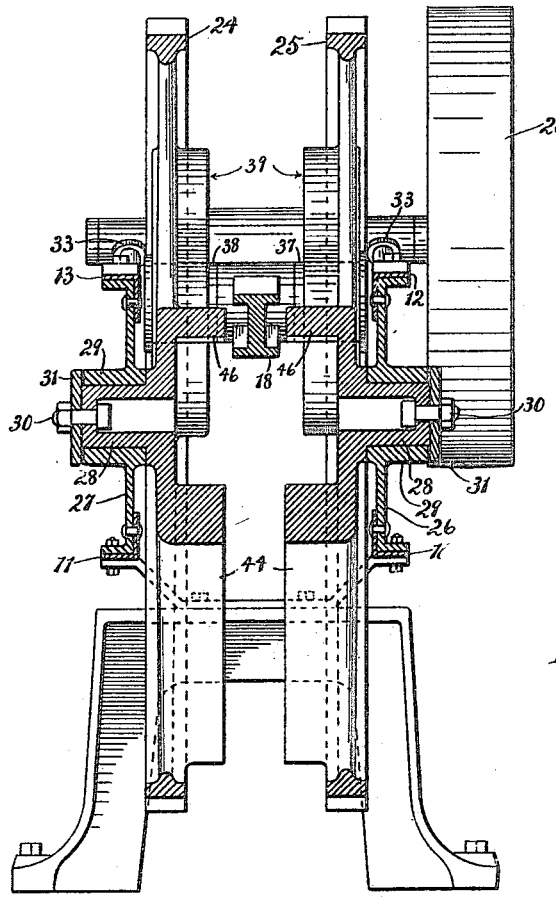
Figure 4:
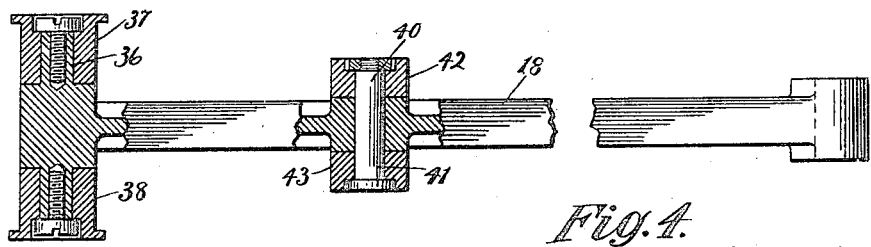
Figure 5:
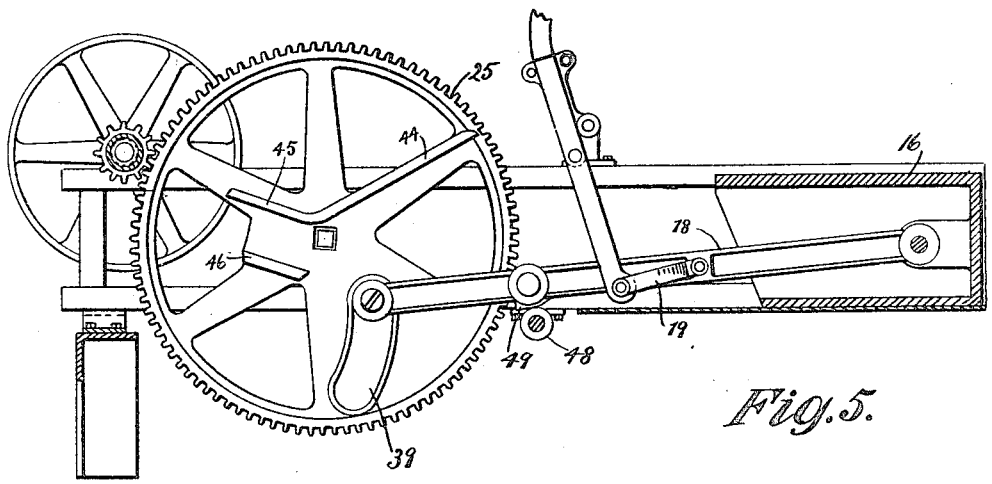
Figure 6:
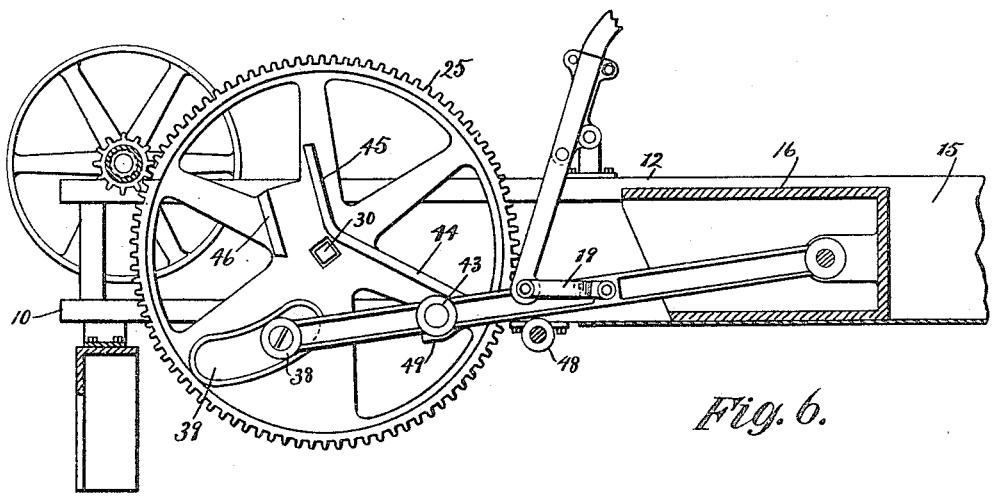

Figure 1 is a detail side elevation of the power end of the press; Fig. 2 is a detail plan view thereof; Fig. 3 is a sectional view on the line 3—3 of Fig. 2; Fig. 4 is a detail, partly in section, of the pitman used in the machine; and Figs. 5 and 6 are detail longitudinal vertical sections of the machine showing the power mechanism in different positions.

The body of the machine is, as usual, composed of a suitable frame, here shown as comprising a pair of longitudinal sills 10, 11, and a pair of top beams 12, 13, these several parts being angle bars and being suitably tied together. The forward end of the structure is boxed in, as represented at 14, to form a baling chamber having a feed opening at 15 for receiving the material. A plunger 16 reciprocates in the baling chamber, across the feed opening, and there is provided a beater 17 mounted to oscillate into and out of the baling chamber through the feed opening, for the purpose of compacting the newly introduced charge in front of the plunger. This beater is actuated from the pitman 18 which drives the plunger, being connected with the pitman by means of links 19, as usual.

A belt pulley 20, or its equivalent, is fixed on a shaft 21, journaled in suitable boxes at the rear end of the body, this shaft carrying pinions 22, 23, which mesh with a pair of drive wheels 24, 25, journaled in a pair of side plates 26, 27, attached to the frame members 10, 11, 12, 13. The drive wheels are much larger than the pinions for the purpose of multiplying power.

Preferably each of the drive wheels 24, 25, is provided with an outwardly projecting hub 28, entering an outwardly extending box 29 on the plate 26 or 27. The hub is counterbored from its inner end to receive a bolt 30, which extends through a washer 31 bearing against the outer end of the box 29, and the wheels are further stayed by means of rollers 32, 33, 34 and 35, mounted in brackets secured to the frame members, these rollers bearing laterally against the rims of the wheels.

A crank pin 36, here shown as taking the form of gudgeons on the rear end of the pitman 18, and provided with anti-friction rollers 37, 38, engages slots 39, one in each of the wheels 24, 25. These slots extend outwardly from near the center of the wheel, and are oblique to radii intersecting them, the outer ends of the slots being inclined forwardly with reference to the direction of rotation of the drive wheels. Preferably, also, the slots are slightly curved in the direction of their inclination. Gudgeons 40, 41, extend laterally from the pitman 18 intermediate of its ends, and each carries an anti-friction roller 42, 43.

A flange 44, formed on the inner face of each of the drive wheels, extends from its center to its rim and is located back of the slot 39, with reference to the direction of driving rotation. A flange 45 extends along the face of each wheel from the inner end of the flange 44 of which it constitutes a continuation. The flange 45 is inclined forwardly with reference to the direction of driving rotation, and terminates short of the rim of the wheel. A third short flange 46 is formed on the inner face of each wheel parallel with the flange 45, and between it and the slot 39.

A shaft 47, journaled in suitable boxes secured to the sill members 10, 11, and located forward of the wheels 24, 25, carries an anti-friction roller 48 upon which the pitman rides during a portion of the return stroke. In order to prevent jar the lower face of the pitman is provided with an inclined boss 49, which makes contact with the roller 48 before the pitman has reached the limit of its downward movement.

When the plunger 16 is at the end of its back stroke the slot 39 is slightly below the center of the drive wheel and extends substantially horizontal, the crank pin being at its outer end. The drive wheels rotate in clockwise direction (the machine being viewed from the right side), and as they turn to begin the compression stroke of the plunger the rollers 42, 43, enter between the flanges 45, 46,—the latter insuring the movement of the crank-pin toward and to the inner end of the slot 39, and the initial forward movement of the plunger is due to a camming action of the rear wall of the slot. Meantime the flange 45 prevents a too abrupt drop of the pitman, should the resistance offered by the material to the advance of the plunger be but slight. When, as the movement advances, the rollers 42, 43, pass beyond the flanges 46, any tendency to fly upwardly, before the slot 39 becomes inclined forwardly from the perpendicular so as to prevent such movement, is resisted by the stem of the beater 17 and its link 19, which is then vertical. During the latter portion of the compression stroke, the crank-pin rests securely within the inner end of the slot 39, and the pressure upon the plunger increases as the pitman approaches the line from the axes of the drive wheels to the point of attachment of the pitman to the plunger. At the beginning of the return stroke the boss 49 rides on the roller 48, as shown in Fig. 5.

The rebound of the plunger, under the expansive influence of the newly compressed charge, is prevented by the substantially vertical position of the slot 39. The plunger is carried back initially by the crank-pin, and as the slot 39 approaches the horizontal the outer ends of the flanges 44 engage the rollers 42, 43, and carry the plunger back rapidly, forcing the crank-pin to the outer end of the slot 39 and completing the cycle of movement. During the early part of the advance stroke the rollers 42, 43, travel inwardly along the flanges 44 until they enter between the flanges 45, 46.

While a preferred form of construction is shown, various changes in the details may be made without departing from the scope of the invention. So too, the contour of the slot 39 and of the several flanges may be varied. While the engagement of the crank-pin with the drive wheels is by means of a slot, any suitable ways for the crank-pin to travel upon may be substituted, ample strength being provided for.

The press will ordinarily be portable, and for that reason mounted upon carrying wheels, as usual in devices of this class.

I claim as my invention—

1. In a baling press, in combination, a reciprocable plunger, a revoluble drive wheel having a slot extending outward with reference to its center, a pitman attached to the plunger and having a gudgeon entering and movable in the wheel slot, and means for guiding the gudgeon toward and away from the center of the wheel at different periods in the cycle of movement.

2. In a baling press, in combination, a reciprocable plunger, a revoluble drive wheel having a slot oblique to a radius intersected thereby, a pitman attached to the plunger and having a gudgeon entering and movable in the wheel slot, and means for guiding the gudgeon toward and away from the center of the wheel at different periods in the cycle of movement.

3. In a baling press, in combination, a reciprocable plunger, a drive wheel having a slot oblique to a radius intersected thereby, a pitman attached to the plunger and having a gudgeon entering and movable in the wheel slot, a flange extending outwardly on the side face of the wheel, and a gudgeon on the pitman intermediate of its ends engageable by the flange.

4. In a baling press, in combination, a reciprocable plunger, a drive wheel having an outwardly extending slot in its side face and an outwardly extending flange on such face, a pitman connected to the plunger and having a gudgeon engaging the slot and a gudgeon engageable by the flange.

5. In a baling press, in combination, a reciprocable plunger, a revoluble drive wheel, a pitman connected to the plunger and to the wheel, its connection to the wheel being slidable toward and away from the center thereof, and means for shifting such connection to the wheel at different parts in the cycle.

6. In a baling press, in combination, a reciprocable plunger, a drive wheel, a pitman connected to the plunger and to the wheel, its connection to the wheel being slidable toward and away from the center thereof, an outstanding flange on the wheel, and a gudgeon on the pitman engageable by the flange.

7. In a baling press, in combination, a reciprocable plunger, a drive wheel, a pitman connected to the plunger and to the wheel, its connection to the wheel being slidable toward and away from the center thereof, and flanges on the wheel engageable with the pitman for shifting its slidable connection with the wheel.

8. In a baling press, in combination, a reciprocable plunger, a drive wheel, a pitman connected to the plunger and having pivotal connection with the wheel slidable toward and away from the center thereof, such latter connection being shifted to the inner position during the compression stroke of the plunger, and a flange on the wheel engageable with the pitman for moving the plunger on its return stroke.

9. In a baling press, in combination, a reciprocable plunger, a drive wheel, a crank pin associated with the wheel and shiftable toward and away from the center thereof, a pitman connected to the plunger and the crank pin, a flange on the wheel engageable with the pitman for shifting the crank pin toward the center for the compression stroke, and a flange on the wheel engageable with the pitman for shifting the crank-pin outward during the return stroke.

10. In a baling press, in combination, a reciprocable plunger, a drive wheel having a slot extending outwardly in its side face and being inclined forwardly at its outer end with reference to the direction of rotation in driving, a crank-pin slidable in the slot, a pitman connecting the plunger and crank-pin, a flange on the wheel engageable with the pitman for moving the crank-pin inwardly at the commencement of the compression stroke, means for preventing the outward movement of the crank-pin after the flange is disengaged from the pitman.

11. In a baling press, in combination, a reciprocable plunger, a drive wheel, a crank-pin associated with the wheel and movable toward and from its center, a pitman connected with the plunger and the crank-pin, means for shifting the crank-pin toward the center of the wheel for the compression stroke and toward the rim of the wheel for the return stroke, and a support for the pitman on the return stroke.

12. In a baling press, in combination, a reciprocable plunger, a pair of drive wheels each having a slot in its side face extending toward its rim and being inclined forwardly with reference to the driving direction of rotation, a crank-pin slidable in such slots, a pitman connecting the pin with the plunger, a guide flange on each wheel for moving the crank-pin toward the center of the wheel for the compression stroke, a flange on each wheel engageable with a lug on the pitman for withdrawing the plunger and moving the crank-pin to the outer end of the slots.

13. In a baling press, in combination, a reciprocable plunger, a revoluble drive wheel, a pitman connected to the plunger and to the wheel, its connection to the wheel being slidable toward and away from the center thereof, and a cam for moving such connection inwardly for the compression stroke.

PLIN C. SOUTHWICK.